May 17, 1949.  H. J. HORN  2,470,559
VEHICLE WHEEL

Filed March 29, 1946  2 Sheets-Sheet 1

*INVENTOR.*
HARRY J. HORN

BY

*Carroll R. Faber*
ATTORNEY

May 17, 1949. H. J. HORN 2,470,559
VEHICLE WHEEL

Filed March 29, 1946 2 Sheets-Sheet 2

INVENTOR.
HARRY J. HORN
BY
Carroll R. Taber
ATTORNEY

Patented May 17, 1949

2,470,559

UNITED STATES PATENT OFFICE 2,470,559

VEHICLE WHEEL

Harry J. Horn, Lansing, Mich., assignor to Motor Wheel Corporation, Lansing, Mich., a corporation of Michigan Application March 29, 1946, Serial No. 658,036

11 Claims. (Cl. 301—37)

This invention relates to vehicle wheels and more particularly to the means for detachably connecting ornamental covers thereto.

The principal object of the present invention is to provide an exceptionally simple and inexpensive form of attaching clip for detachably connecting wheel covers such as hub caps and wheel cover plates to a vehicle wheel.

Another object is to provide such an attaching clip which is especially effective in holding the cover on the wheel yet permits the cover to be easily attached thereto.

A still further object is to provide a novel form of attaching clip which can be readily mounted on the wheel.

These objects will more fully appear in the following specification when read in connection with the accompanying drawings, wherein.

Figures 1, 2:
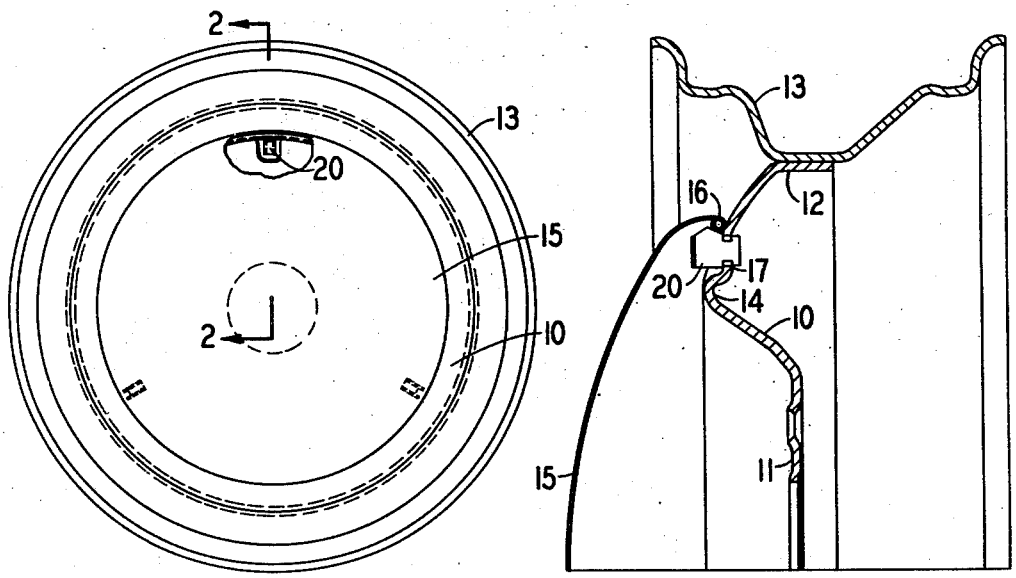
Figure 1 is a front elevational view of a vehicle wheel embodying the invention.
Figure 2 is a fragmentary enlarged cross-sectional view of the same taken on the line 2—2 of Figure 1.
Figure 3:
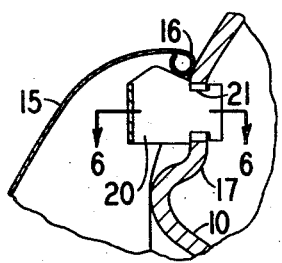
Figure 3 is a fragmentary cross-sectional view similar to a portion of Figure 2 on an enlarged scale.

Figures 1 to 6 illustrate a wheel embodying one form of the invention. The wheel comprises a wheel body 10 adapted to be demountably attached to a hub (not shown). The wheel body is of conventional form and includes a bolting on flange 11 and a peripheral rim mounting flange 12. A rim 13 is permanently attached to the rim flange 12. Intermediate the flanges 11 and 12 is an outwardly projecting annular nose portion 14 of the cross-sectional configuration shown in Figure 2.

An ornamental cover 15 is detachably connected to the wheel, and it is in the means for attaching the cover to the wheel that the present invention resides.

The cover preferably is dish shaped and is formed from sheet metal. About its periphery is a radially and axially inturned flange, which, in the cover shown, takes the form of a rolled bead 16. Thus, the inner circumference of the bead is less than the greatest circumference of the cover. The periphery of the cover 15, including the bead 16, is somewhat flexible, so that it may be distorted slightly from its normally circular shape, as will more fully appear presently.

Figure 4:
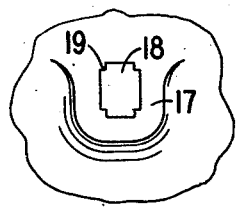
Figure 4 is an enlarged fragmentary front elevational view of the wheel with the clip removed.
Figure 5:
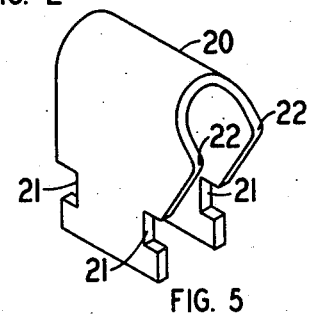
Figure 5 is a perspective view of an attaching clip.

Radially outward of the point of the nose 14 the wheel body is indented inwardly to provide flat spots 17. The flat spots 17, which form seats for attaching clips, need not be radially outward of the nose 14, but may be on the nose or radially inward thereof. Three such flat spots are formed in the wheel shown, but it will be evident as the description proceeds that this number may be varied, within limits, as desired. An opening 18 of the shape shown in Figure 4 is pierced through each flat spot 17. The openings 18 are generally rectangular with small angular projections 19 at each corner.

The attaching clips for the cover are generally U-shaped straps 20. Preferably the straps are formed of spring steel, and therefore, are elastic. The legs of the straps preferably are spaced apart slightly more than the width of the openings 18. Adjacent the extremity of each leg are two notches 21. One side of each strap is straight, while the other side is fashioned so that when bent into U-shape, a pair of relatively sharp edged humps 22, which register with each other in a transverse direction, are provided. The peaks of the humps are spaced from the notches 21 a substantial distance.

The clips 20 are secured to the wheel by pressing the legs together and inserting them in the openings 18 in the wheel body so that the notches 21 receive the projections 19. When the legs are released the elasticity thereof holds the clips firmly in place. It will be evident, of course, that the humps 22 should extend in a radial direction relative to the wheel.

While it has been stated that the clips 20 are elastic, they are stiff enough to require considerable pressure to force the legs toward each other. Then when the clips are attached to the wheel the entire structure becomes quite rigid, especially in a radial direction.

The cover is attached to the wheel by locating the bead 16 between the humps 22 on two of the clips and the wheel body and then forcing the bead over the humps on the third clip. The bead on the cover is distorted momentarily as it rides over the humps and then resumes, or nearly resumes, its circular configuration, firmly holding the cover in place. The cover is removed by placing a tool such as a screw driver between the wheel body and bead and prying the cover off.

It will be apparent from the foregoing that because the humps on the legs of the clips are in transverse registry with each other, while the rim of the cover is circular, the cover will engage each clip at only two spaced points. Also, the surfaces of the humps between the peaks thereof and the wheel body form an acute angle with the wheel axis. Because of these features the cover is held more firmly on the wheel than would be the case were the angle near 90°.

The modification of the invention shown in Figures 7 to 10 is somewhat similar to the form previously described, particularly in the manner of attaching the clips to the wheel. However, the shape of the clips and their arrangement on the wheel is different.

Figures 7 to 10 show only a small fragment of a wheel 30 which is shaped exactly like the wheel 10 previously described. The wheel is provided with depressions to form flat spots 31 through which openings 32 are pierced. The openings 32 are shaped like openings 18 but are arranged with their longer axes in a circumferential direction relative to the wheel 30, rather than in a radial direction.

Figure 9:
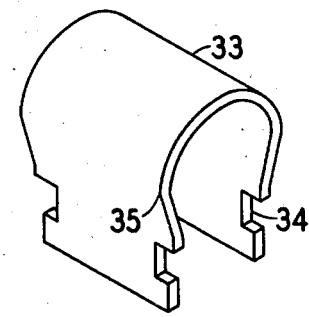
Figure 9 is a perspective view of the modified clip.
Figure 6:
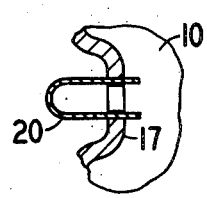
Figure 6 is a fragmentary cross-sectional view taken on substantially the line 6—6 of Figure 3.
Figure 10:
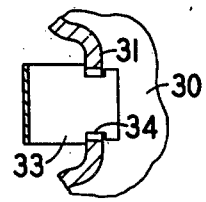
Figure 10 is a fragmentary cross-sectional view taken on substantially the line 10—10 of Figure 7.
Figure 12:
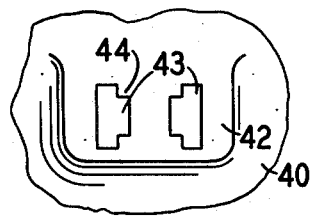
Figure 12 is a fragmentary elevational view of the wheel with the clip removed.
Figure 13:
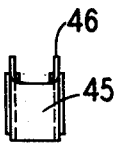
Figures 13, 14 and 15 are respectively front elevational, side elevational and top plan views of the clip shown in Figure 11.
Figure 14:
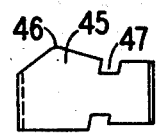

Cover attaching clips 33 are shown in perspective in Figure 9. Each clip is generally U-shaped but the base of the U is bulged out to provide humps 35. The legs of each clip are notched at 34 to engage the projections in the corners of the opening 32. Both edges of each leg of each clip are straight and parallel to each other, when viewed in a direction radially of the wheel, from the outer sides of notches 34 to the axially outer extremity of the clip.

Figure 7:
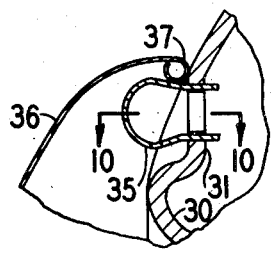
Figure 7 is a fragmentary cross-sectional view of a wheel embodying a modified form of the invention.
Figure 8:
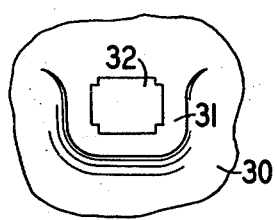
Figure 8 is a fragmentary elevational view of the wheel shown in Figure 7 with the clip removed.

The clips are mounted in openings 32 with the legs thereof arranged in radially spaced relation, as shown in Figure 7, and held therein in the same manner as clips 20 previously described.

A cover 36 having a rolled marginal flange forming a bead 37 is snapped over the humps 35. As the bead passes over the humps it is distorted slightly and then substantially resumes its normal circular shape. The bead engages each clip only at the side edges of the radially outer leg of the clip.

Figures 11 to 15 illustrate a further modified form of the invention. This form is employed in connection with a wheel having a wheel body 40 and a rim 41.

The wheel body 40 is provided with a plurality of angularly spaced depressions which form flat spots 42. The flat spots are not quite radial, as in the previously described structures, but are inclined slightly, as shown. In each flat spot, a pair of angularly spaced apart openings 43 are formed. The openings are generally rectangular, but two inwardly extending projections 44 are formed in the opposite corners of each opening with one nearest the other opening.

A plurality of cover attaching clips 45 are mounted in each pair of openings 43. The clips 45 are essentially the same as clips 20 shown in Figures 1 to 5. Each clip 45 is generally U-shaped. Humps 46 are provided on the upper edges of the legs of the U. Notches 47 are cut in both edges of each leg to receive the projections 44. It will be noted that the notches 47 on the same leg are offset slightly from each other and are inclined. This configuration is necessary because of the inclination of the base of the flat spot where the clip is located.

Figure 15:
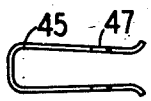
Figure 11:
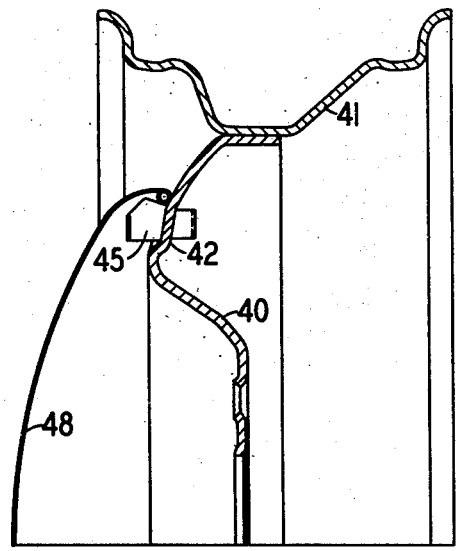
Figure 11 is a fragmentary cross-sectional view of a wheel embodying a modified form of the invention.
Figure 17:
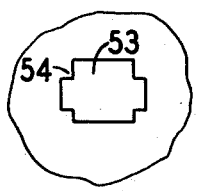
Figure 17 is a fragmentary elevational view of the wheel shown in Figure 16, with the cover removed.
Figure 18:
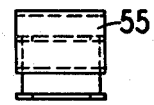
Figures 18, 19 and 20 are respectively front elevational, side elevational and top plan views of the clip shown in Figure 16.

The legs of the clips 45 normally converge slightly, as shown in Figure 15.

The clips are attached to the wheel by spreading the legs slightly and inserting one leg in each opening 43. The legs of the clips are then released, whereupon they spring together and the notches 47 receive the projections 44. The clips are thus securely locked in position.

A cover 48, similar to cover 15, is mounted on the clips 45 in the same manner as cover 15.

Figures 16 to 20 illustrate another type of cover attaching clip. It is used with a conventional wheel having a wheel body 50, a rim 51 and a cover 52.

A plurality of angularly spaced openings 53 are punched, or otherwise formed, in the wheel body. The openings are generally rectangular with projections 54 in the corners. It will be noted that the openings 53 are formed in the curved wheel body without forming the flat spots previously described. Such flat spots may be provided, however, if desired.

Figure 19:
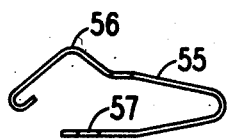
Figure 20:
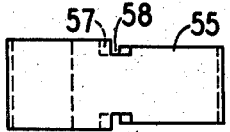
Figure 16:
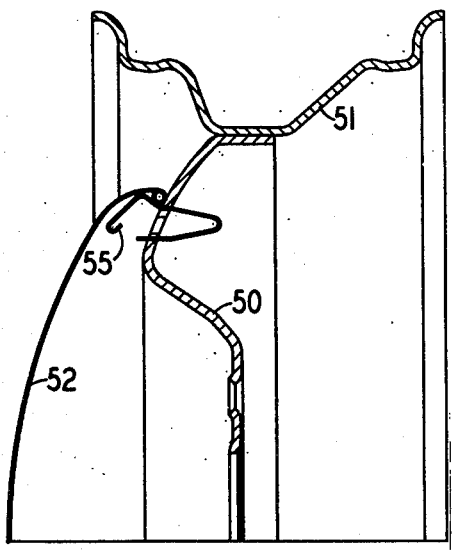
Figure 16 is a fragmentary cross-sectional view of a wheel embodying a still further modified form of the invention.

Clips 55 are mounted in the openings 53. Each clip 55 is generally U-shaped, but one leg is considerably longer than the other. The longer leg is bent to provide a hump 56, as illustrated in Figure 19.

In the edges of the shorter leg of the clip are two notches 57, while similar notches 58 are formed in the other leg. The notches 58 are offset from notches 57 because of the inclination of the portion of the wheel body to which the clip is attached.

The clips 55 are attached to the wheel body by pushing the base of the U through toward the inboard side of the wheel body until the notches 57 and 58 register with projections 54. The legs of the clip spring apart and the clip is firmly attached to the wheel.

The cover 52 is snapped over the humps 56 on the clips in much the same way as the covers previously described are attached to the wheel. A somewhat stiffer cover may be employed in connection with the clips 55, however, as these clips are more readily deflectable than those shown in Figures 1 to 11, due to the increased length of the legs over which the cover is snapped. The latter legs will spring toward the center of the wheel slightly when the cover is pushed toward the wheel, returning to their former positions after the rim of the cover has passed the humps 56.

From the foregoing it will be apparent that the present invention provides a very economical, easily fabricated attaching means for a wheel cover. The clips which constitute the invention are especially advantageous because of the simple manner of attaching the clips to the wheel, as well as because of the secure manner in which the clips hold the cover in place. The secure attachment of the cover is due in part to the relatively acute angle between the wheel axis and the humps over which the cover is sprung, and in part to the fact that the bead on the cover engages the clips along relatively sharp edges which tend to dig into the bead when the latter is applied.

The scope of the invention is indicated in the appended claims.

I claim:

1. The combination of a wheel having a wheel body, a cover therefor, and means for detachably connecting said cover to said wheel, said cover comprising a dish shaped member having a relatively flexible radially inturned marginal rim, said means comprising a plurality of angularly spaced generally U-shaped relatively rigid straps attached adjacent the extremities of the legs thereof to said wheel body and projecting axially outwardly therefrom, said straps being formed to provide radially outwardly projecting humps spaced axially of said wheel body and over which said cover is adapted to be forced, the radially outer extremities of said humps being arranged on a circle of slightly greater circumference than the inner circumference of the inturned portion of said rim, whereby the relatively flexible rim of the cover is distorted when forced over said humps on the relatively rigid straps.

2. The combination defined in claim 1 wherein said straps are detachably connected to said wheel body.

3. The combination defined in claim 1 wherein the legs of said straps are arranged in radially spaced relation on said wheel body.

4. The combination defined in claim 1 wherein the legs of said straps are arranged in angularly spaced relation on said wheel body.

5. The combination defined in claim 1 wherein said wheel body is provided with openings of less width than the normal distance between the legs of said straps, and the latter are sprung into said openings.

6. The combination defined in claim 1 wherein said wheel body is provided with openings therein for the reception of the legs of said straps of less width than the normal distance between the latter, and said legs are provided with means to interlock with the wheel body at the perimeters of said openings.

7. The combination of a wheel having a wheel body, said wheel body having a plurality of angularly spaced openings therein for the reception of cover attaching clips, each of said openings having a pair of spaced apart radially inwardly extending projections on the perimeter thereof, and a plurality of cover attaching clips, said clips being in the form of metal straps having generally U-shaped portions the legs of which are received in said openings, said legs having notches in the edges thereof receiving said projections.

8. In a wheel having a wheel body, means on said wheel body for attaching a cover thereto comprising a plurality of angularly spaced generally U-shaped relatively rigid straps attached adjacent the extremities of the legs thereof to said wheel body and projecting axially therefrom, said straps being formed to provide radially projecting humps spaced axially of said wheel body.

9. In a wheel having a plurality of cover attaching means of the character defined in claim 8 wherein the surfaces of the humps between the peaks thereof and the wheel body form an acute angle with the wheel axis.

10. In a wheel having a plurality of cover attaching means of the character defined in claim 8 wherein the legs of said U-shaped straps are spaced angularly of each other relative to said wheel, and said humps are formed on the radially outer edges of said straps.

11. The combination of a wheel having a wheel body, a cover therefor, and means for detachably connecting said cover to said wheel, said cover comprising a dish shaped member having a relatively flexible marginal rim, said means comprising a plurality of angularly spaced generally U-shaped relatively rigid straps attached adjacent the extremities of the legs thereof to said wheel body and projecting axially outwardly therefrom, said straps being formed to provide radially projecting humps spaced axially from said wheel body and over which said rim of the cover is adapted to be forced, the radial extremities of said humps being arranged on a circle of such circumference that said relatively flexible marginal rim is distorted when the latter is forced over said humps on the relatively rigid straps.

HARRY J. HORN.

REFERENCES CITED

The following references are of record in the file of this patent:

UNITED STATES PATENTS

| Number | Name | Date |
|---|---|---|
| 2,088,109 | Horn | July 27, 1937 |
| 2,217,116 | Hunt | Oct. 8, 1940 |